(12) United States Patent
Strehle

(10) Patent No.: US 11,938,550 B2
(45) Date of Patent: Mar. 26, 2024

(54) DRILL HEAD FOR CHAMBERING NON-CYLINDRICAL INNER CONTOURS

(71) Applicant: botek Präzisionsbohrtechnik GmbH, Riederich (DE)

(72) Inventor: Gerhard Strehle, Wangen (DE)

(73) Assignee: botek Präzisionsbohrtechnik GmbH, Riederich (DE)

( * ) Notice: Subject to any disclaimer, the term of this patent is extended or adjusted under 35 U.S.C. 154(b) by 128 days.

(21) Appl. No.: 17/423,309

(22) PCT Filed: Jan. 15, 2020

(86) PCT No.: PCT/EP2020/050907
§ 371 (c)(1),
(2) Date: Jul. 15, 2021

(87) PCT Pub. No.: WO2020/148331
PCT Pub. Date: Jul. 23, 2020

(65) Prior Publication Data
US 2022/0080514 A1    Mar. 17, 2022

(30) Foreign Application Priority Data

Jan. 15, 2019  (DE) .................... 10 2019 100 891.3

(51) Int. Cl.
*B23B 51/00*   (2006.01)
*B23B 29/034*  (2006.01)

(52) U.S. Cl.
CPC .... *B23B 51/0027* (2013.01); *B23B 29/03464* (2013.01)

(58) Field of Classification Search
CPC .. B23B 5/06; B23B 5/16; B23B 5/167; B23B 5/38; B23B 5/46; B23B 5/48;
(Continued)

(56) References Cited

U.S. PATENT DOCUMENTS 1,312,737 A *  8/1919  Krueger ............ B23B 29/03453
                                                  408/158
1,916,253 A     7/1933  Buckley
(Continued)

FOREIGN PATENT DOCUMENTS

CN      1575217 A      2/2005
CN    101300400 A     11/2008
(Continued)

OTHER PUBLICATIONS

International Search Report Form PCT/ISA/210, and Written Opinion Form PCT/ISA/237, International Application No. PCT/EP2020/050907, pp. 1-6 International Filing Date Jan. 15, 2020 mailing date of search report dated May 12, 2020.
(Continued)

*Primary Examiner* — Nicole N Ramos
(74) *Attorney, Agent, or Firm* — George R. McGuire

(57) ABSTRACT

The invention relates to a drill head for chambering non-cylindrical, rotationally symmetrical holes. This drill head is characterized in that, starting from a diameter of a guide hole, it can cut a very large chamber out of a workpiece. In addition, the drill head has a simple design and is very robust and tight, so that high cutting capacities can be reliably achieved.

12 Claims, 17 Drawing Sheets

(58) Field of Classification Search
CPC ............... B23B 27/007; B23B 29/034; B23B 29/03414; B23B 29/03432; B23B 29/03457; B23B 41/02; B23B 41/06; B23B 41/10; B23B 41/12; B23B 51/0018; B23B 51/0027; B23B 51/0045; B23B 51/0417; B23B 51/101; B23B 51/105; B23B 51/106; B23B 2220/04; B23B 2220/08; B23B 2220/123; B23B 2220/52; B23C 3/32; B23C 2270/218; B23C 2220/16; B23C 2220/24

See application file for complete search history.

(56) References Cited

U.S. PATENT DOCUMENTS

| | | | | |
|---|---|---|---|---|
| 2,841,053 | A * | 7/1958 | Horlacher | B23B 41/06 409/125 |
| 3,315,549 | A * | 4/1967 | Malschner | B23B 5/40 408/180 |
| 3,842,697 | A * | 10/1974 | Striegl | B23B 29/24 82/131 |
| 3,854,839 | A | 12/1974 | Gottelt | |
| 4,047,829 | A | 9/1977 | Lloyd et al. | |
| 4,307,636 | A * | 12/1981 | Lacey | B23B 51/0045 82/1.5 |
| 4,347,768 | A * | 9/1982 | Boehm | B23B 51/0045 408/180 |
| 4,357,846 | A * | 11/1982 | Primo | B23Q 35/102 82/1.4 |
| 4,401,172 | A * | 8/1983 | Kessler | E21B 10/32 175/283 |
| 4,433,598 | A * | 2/1984 | Murray | B23B 51/106 82/131 |
| 5,848,860 | A * | 12/1998 | Steiner | B23B 51/102 408/180 |
| 5,967,007 | A * | 10/1999 | Scheer | B23C 3/055 82/86 |
| 2012/0163933 | A1 | 6/2012 | Richt et al. | |
| 2012/0255407 | A1 * | 10/2012 | Maurer | B23Q 1/76 82/164 |

FOREIGN PATENT DOCUMENTS

| | | |
|---|---|---|
| CN | 1184012 A | 6/2023 |
| DE | 1477352 A1 | 5/1969 |
| DE | 3032405 A1 | 3/1981 |
| DE | 19605069 A1 | 8/1997 |
| DE | 102008004516 A1 | 8/2009 |
| DE | 102008004516 B4 * | 2/2015 ......... B23B 51/0045 |

OTHER PUBLICATIONS

Translated Chinese First Office Action, App. No. 202080014147.X, dated Sep. 1, 2023, pp. 1-8.

\* cited by examiner

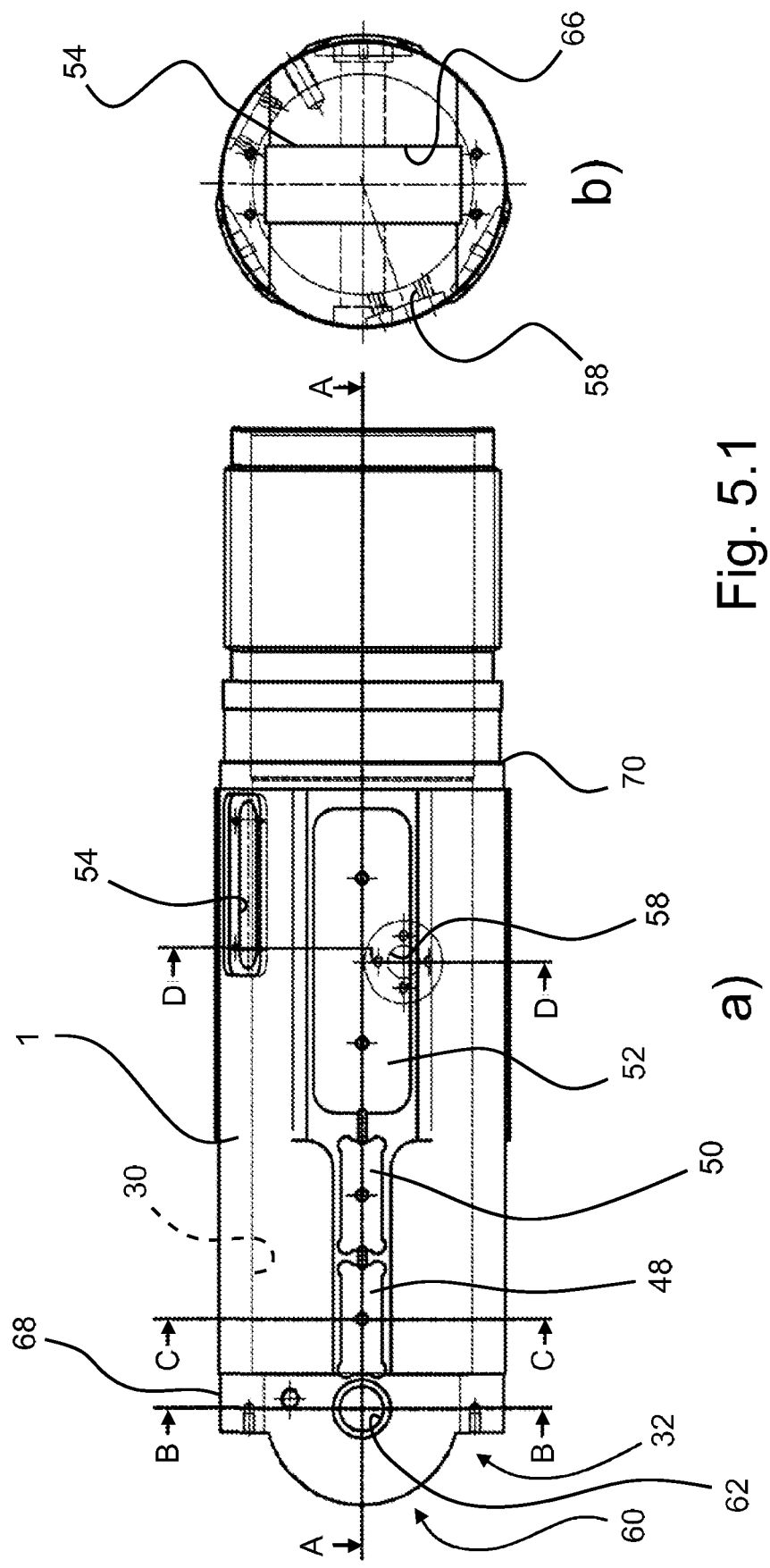
Fig. 5.1

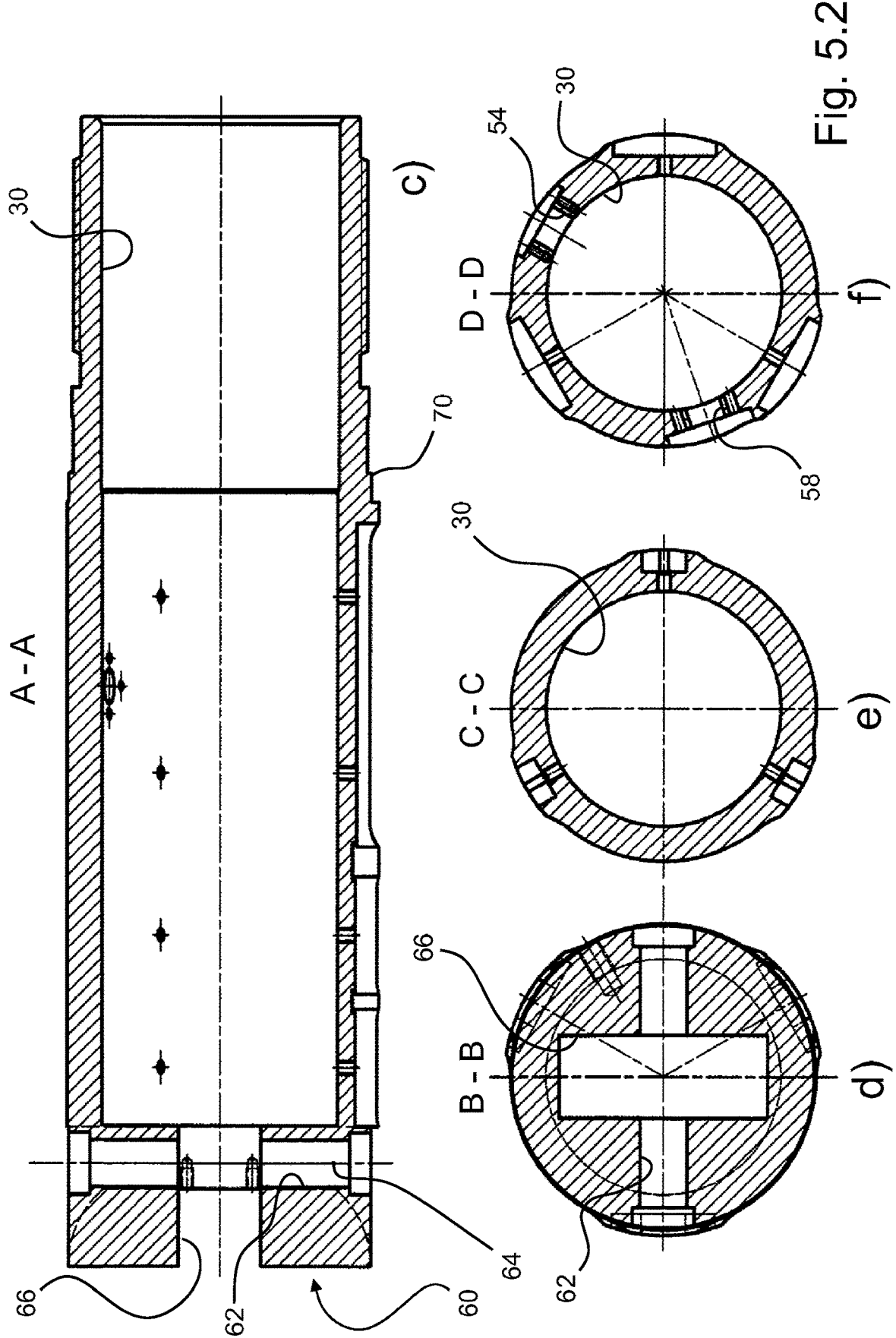

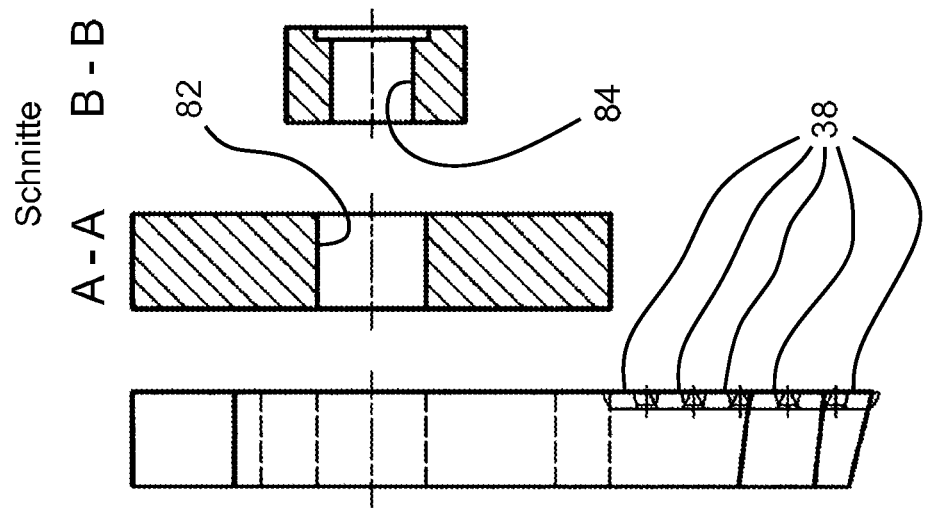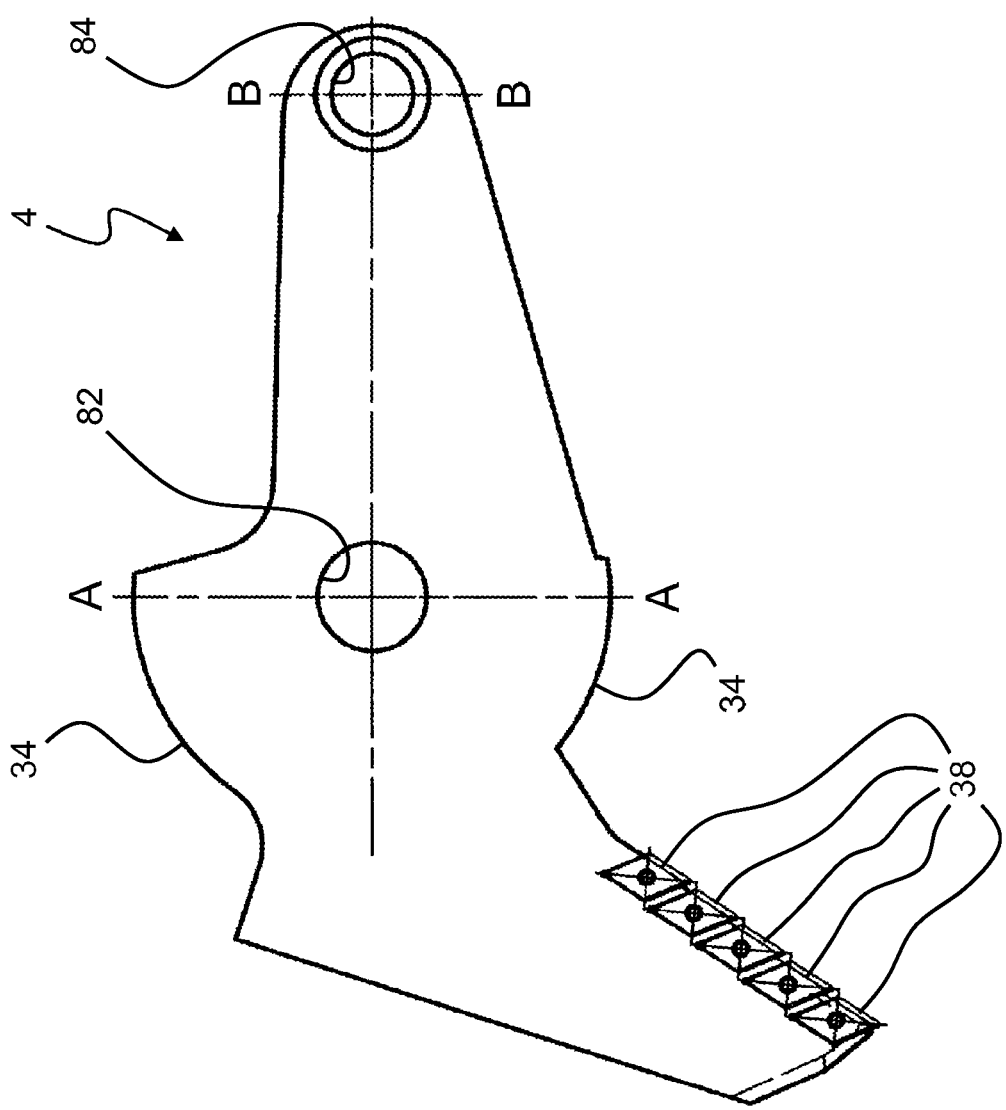
Fig. 8

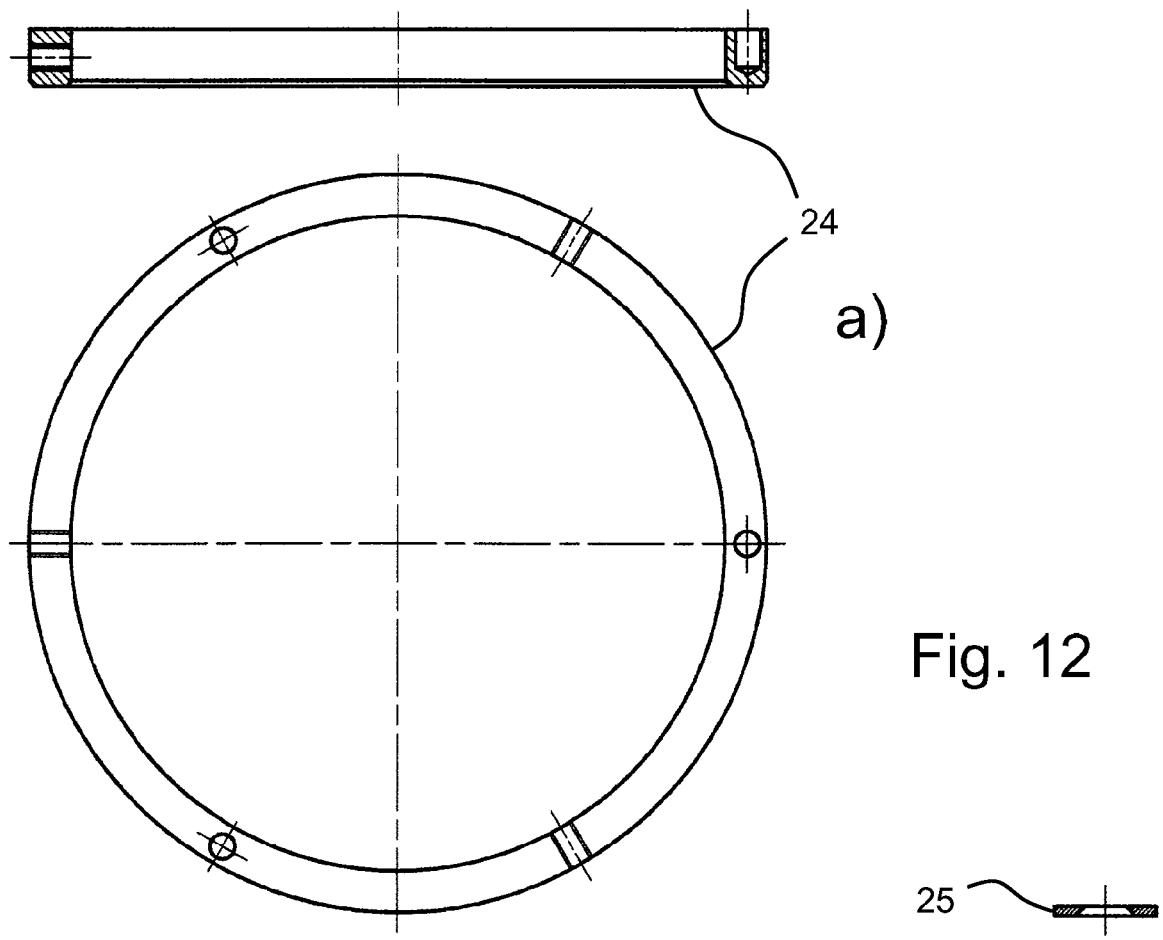
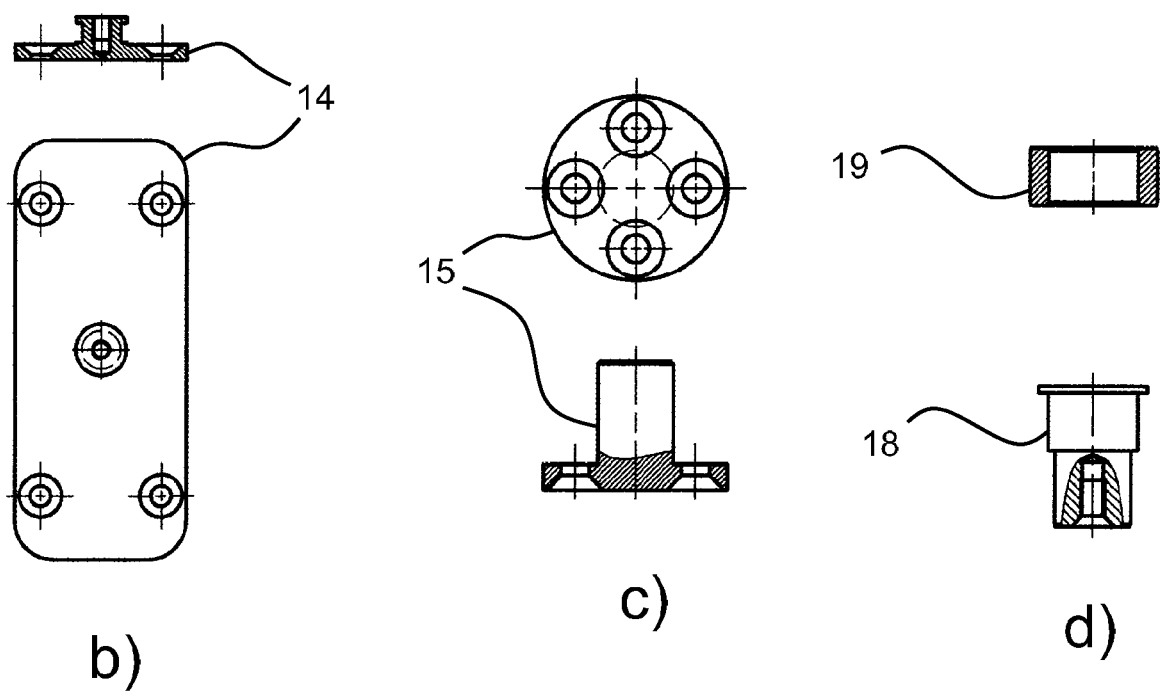
Fig. 12

DRILL HEAD FOR CHAMBERING NON-CYLINDRICAL INNER CONTOURS

CROSS-REFERENCE TO RELATED APPLICATIONS

This is a National Stage Application filed under 35 U.S.C. 371 based on International Patent Application No. PCT/EP2020/050907, filed on Jan. 15, 2020, which claims priority to German Patent Application No. 10 2019 100 891.3 filed on Jan. 15, 2019, the disclosures of both of which are incorporated herein by reference in their entireties.

DESCRIPTION

The invention relates to a drill head for chambering non-cylindrical inner contours.

Drill heads for chambering or internal turning devices are often used to produce a non-cylindrical, rotationally symmetrical inner contour in the interior of components.

A typical application of such drill heads is the chambering of the forged leg of an aircraft landing gear. Such a landing gear leg generally has a frustoconical outer contour in accordance with the bending moments that occur. In order to make the best possible use of the material and to minimize the weight of the landing gear leg, in many cases the landing gear leg is hollow and also has a frustoconical, i.e. non-cylindrical, inner contour.

To produce such inner contours, internal turning devices or drill heads are used which, starting from a cylindrical guide hole, generate the desired non-cylindrical inner contour. An existing cylindrical guide hole with the diameter $D_{FB}$ is widened by the chamber boring tool so that the diameter $D_{Kmax}$ in the region of the chamber is greater than the diameter $D_{FB}$ of the guide hole.

Drill heads consist of a substantially cylindrical body with a front and rear end between which a central axis extends, a lateral surface concentric to the central axis, and a plurality of guide pads arranged on the circumference. At least one radially displaceable or pivotable insert holder for the inserts of the drill head is arranged at the front end of the drill head. At the rear end, the drill head has a detachable interface for fastening to a drill tube of a boring machine or other machine tool.

The drill head is usually advanced via a centrally arranged control rod. Many machine tools, such as CNC-controlled deep hole drilling machines, lathes or turning-milling machining centers, now have a device for actuating a control rod.

Most known drill heads require a guide hole in the workpiece to be machined. The drill head fastened to the drill tube of the machine tool is inserted on one side (entry side) of the guide hole. A coolant, e.g. deep drilling oil or a water-oil emulsion, is supplied between the drill tube and the rear end of the guide hole, which both removes the chips produced during the chambering process and also cools the cutting edges. The coolant emerges on a second, opposite side (exit side) of the workpiece, where it is caught and fed back into the machine.

DE 196 05 069 A1 discloses such a drill head, which is referred to therein as an internal turning device. The drill head has a slider which is movable in the radial direction, i.e. perpendicularly to the hole axis, and which carries an insert. A longitudinal slider actuated by the control rod of the machine tool is mounted in the cutting head such that it can move axially and is coupled to the slider via a wedge gear. The insert is advanced in this way.

Another internal turning tool is known from U.S. Pat. No. 3,854,839 (Gottelt). The tool has two insert holders which are pivotably mounted in a body and to each of which at least one insert is attached for machining the desired inner contour (=chamber) of the workpiece.

The insert holders are designed as two-sided levers, one end of which carries the inserts and the other end of which has a slotted link. The slotted links of the two insert holders interact with a control pin, which in turn is fixed in a yoke that can be displaced in the axial direction of the drill head. The yoke is actuated by a threaded spindle that can be rotationally driven. In this way, an axial control movement of the threaded spindle is converted into a pivoting movement of the insert holders and finally into an advancing of the inserts.

In these drill heads mentioned by way of example, the ratio between the maximum diameter $D_{Max}$ of the chamber and the diameter of the guide hole $D_{FB}$ is limited to relatively small values. This ratio should be as large as possible. A large chamber can then be produced starting from a small guide hole.

The object of the invention is that of providing a drill head in which a large ratio is achieved between the maximum diameter $D_{Max}$ of the chamber and the diameter of the guide hole $D_{FB}$. In addition, the drill head should allow a high cutting capacity and be easy and reliable to use.

According to the invention, with a drill head for chambering, comprising a body with a rear end and a front end, the body having a mechanical interface at the rear end for connection to a drill tube and a central hole, with two insert holders being pivotably mounted on the body, and the insert holders and an advancing element being coupled to one another via a link motion in such a way that a movement of the advancing element in the axial direction relative to the body triggers a pivoting movement of the insert holders, and the advancing element being axially displaceably guided in the hole, this object is achieved in that the advancing element has a first slotted link and a second slotted link, in that a pin and optionally a roller are provided at rear ends of the insert holders, in that the pin or the roller of a first insert holder interacts with the first slotted link of the advancing element, and in that the pin or the roller of the second insert holder interacts with the second slotted link of the advancing element. The pin and the slotted link form a cam mechanism. The insert holders are arranged opposite one another. As a result, the radial forces are almost completely eliminated during machining and the chip thicknesses are halved with the same chip volume.

In the case of the drill head according to the invention, the pivot range of the insert holders is significantly larger than in the case of the solution known from U.S. Pat. No. 3,854,839. This results in a wide adjustment range of the insert holders and, as a result, the ratio between the maximum diameter $D_{Max}$ of a chamber and the diameter of the guide hole $D_{FB}$, which corresponds approximately to the diameter of the body of the drill head, is greater than that of the prior art solutions. In one embodiment of the drill head according to the invention, a ratio $D_{Max}/D_{FB}$ greater than 1.6 was achieved.

In addition, in the drill head according to the invention, the insert holders are mounted and guided in a very compact and robust manner, so that large advancements and feeds can be achieved.

Due to the favorable leverage ratios between the advancing element and the insert holders, the positioning forces required for advancing are also comparatively small.

Part of the increase in the pivot range of the insert holders can be attributed to the positioning of the pivot axis of the insert holders at the front end of the drill head.

Because the advancing element according to the invention has a separate slotted link for each insert holder and the slotted links extend in the radial direction almost over the entire diameter of the advancing element, the pivot range of the insert holders is significantly increased in the drill head according to the invention. The details of the link motion according to the invention are explained in more detail below in connection with the description of the figures.

Another advantage of the drill head according to the invention is that it consists of relatively few components which are easy to control in terms of production technology, and so the production costs are moderate and the service life of the drill head is very long.

The chamber is produced by the drill head according to the invention in one cut without intermediate stops. This reduces the machining time and reduces costs.

In a further advantageous embodiment of the invention, a bearing pin is provided on the end face of the body and is used to pivotably mount the first and the second insert holder.

Because the pivot point or pivot axis of the insert holders, which coincides with the longitudinal axis of the bearing pin, is arranged at the front end of the body, the insert holders are relatively short and compact, so that they can absorb and transmit large forces that occur during machining safely and without deforming or vibrating.

In order to effectively prevent the penetration of chips into the interior of the drill head, a cylindrical projection is formed on the end face or the front end of the body. A longitudinal axis of the bearing pin and a longitudinal axis of the cylindrical projection extend coaxially to one another. This facilitates or allows effective sealing of the drill head against penetrating chips.

In a further advantageous embodiment, an opening for the insert holders is formed on the end face or at the front end of the body, with a longitudinal axis of the opening extending orthogonally to the longitudinal axis of the bearing pin. In other words: The opening and the pivot axis of the insert holders are perpendicular to one another.

When the insert holders are inserted into the opening and the bearing pin is then pushed through the cylindrical projection into the bearing holes of the insert holders, the insert holders perform a pivoting movement, the pivot axis of which coincides with the longitudinal axis of the cylindrical projection. The opening is dimensioned in such a way that the two insert holders, placed one on top of the other, are guided in the opening without play, but in a pivotable manner, so that a considerable part of the cutting forces are transferred from the insert holders to the body via this planar guidance. This relieves the load on the bearing journal, dampens any vibrations that may occur during machining and allows the transmission of very large forces.

On account of the fact that, in the invention, in an advantageous embodiment of the insert holders according to the invention, at least parts of the outer contour are in the shape of a circular arc and the center of this circular arc also coincides with the longitudinal axis of the cylindrical projection, this results in a closed cylindrical outer contour, regardless of the pivot position of the insert holders, which makes it impossible for chips to penetrate into the interior of the drill head or reduces this to a very small degree. The contour adjoining the circular-arc-shaped outer contour causes the insert holders to clean off chips from one another that may be stuck thereon, and prevents chips from jamming.

By attaching adjustable cleaners in the region of the cylindrical projection or at the front end of the body, it can also be ensured that no chips get into the interior of the drill head.

The advancing element according to the invention is designed in two parts, and comprises a lower part and an upper part. The separating plane between the upper part and the lower part preferably extends through the longitudinal axis of the more or less cylindrical advancing element. The upper part and the lower part are preferably releasably interconnected by screws and pins.

Starting from the separating plane, both the upper part and the lower part have a recess, with a depth T of the recess corresponding to a thickness D of the insert holders. In other words: The ends of the insert holders equipped with a pin can be received next to one another in the recesses of the advancing element. As a result, the rear ends of the insert holders are guided and mounted in the recesses without play, but in a pivotable manner, such that vibrations of the insert holders that may occur during machining are also damped at this point.

A first slotted link and a second slotted link are formed on the bases of the recesses.

It should be noted at this point that the first slotted link is associated with the lower part and the second slotted link is associated with the upper part. This has no significance for the function, but facilitates the disclosure and description of the invention.

The slotted links are designed in such a way that they preferably extend in the radial direction over the entire width of the base of the recesses. That is, if the end points of the usually curved slotted links are connected by a straight line, these straight lines extend at an angle of more than 30°, preferably at an angle of more than 45°, with respect to the longitudinal axis of the advancing element. As a result, a relatively large pivot angle of the insert holders can be realized with a relatively small movement of the advancing element in the axial direction.

In spite of this, the required advancing forces are relatively low and can be safely transmitted via the slotted links and the pins to the insert holders or the associated sleeves.

If desired, the slotted links can be curved in an arc. By suitably shaping the slotted links, a linear relationship can be established between an axial movement of the advancing element relative to the body and the advancing of the insert holders. This facilitates the control of the advancing of the drill head according to the invention. However, even with modern machine controls, it is by all means possible to factor in a non-linear relationship between the movement of the advancing element in the body and the change in the cutting diameter of the drill head. The slotted links can then be designed to be straight.

In a further advantageous embodiment, a coupling pin is provided on the advancing element, in a part of the releasable coupling, and is used to releasably connect the advancing element to the control rod of a boring machine. In this way, the advancing movement is transmitted from the control rod to the advancing element.

In principle, a large number of couplings between the control rod and the advancing element is conceivable. Important considerations in the design of this coupling is that it is simple and robust. In addition, this coupling must also be easily releasable and lockable.

According to a preferred embodiment of the invention, the coupling piece is connected to the control rod via a thread and the coupling piece has a circumferential groove. A coupling pin which can be actuated radially from the outside in a threaded hole of the advancing element can be screwed into this groove. As soon as the coupling pin enters the groove of the coupling element, a form-fitting connection is produced between the control rod and the advancing element, and the advancing movements can be transmitted directly and immediately to the advancing element in the form of an axial relative movement of the control rod with respect to the body of the drill head.

It is also possible to use the drill head according to the invention with different diameters of guide holes in the workpiece. Thus, for example, if a guide hole is significantly larger than the outer diameter of the drill head, an adapter sleeve of which the outer diameter corresponds to the diameter of the guide hole in the workpiece can be placed on the drill head according to the invention. This makes it possible to use the drill head according to the invention for different workpieces with different guide hole diameters. This spares the necessity of purchasing different drill heads with different diameters and is therefore very economical.

The adapter sleeve is centered at the front end of the drill head via a fitting surface. At the rear end of the drill head or at the rear end of the adapter sleeve, a distance ring is pushed between the outer diameter of the body and the adapter ring, so that the adapter ring is also exactly positioned and centered at the rear end.

It goes without saying that guide pads and/or damping pads are arranged both on the body and on the adapter sleeve.

Further advantages and advantageous embodiments of the invention can be found in the following drawings, the description thereof and the claims. All of the features described in the drawings, the description thereof and the claims can be essential to the invention both individually and in any combination with one another.

DRAWINGS

Figure 6:
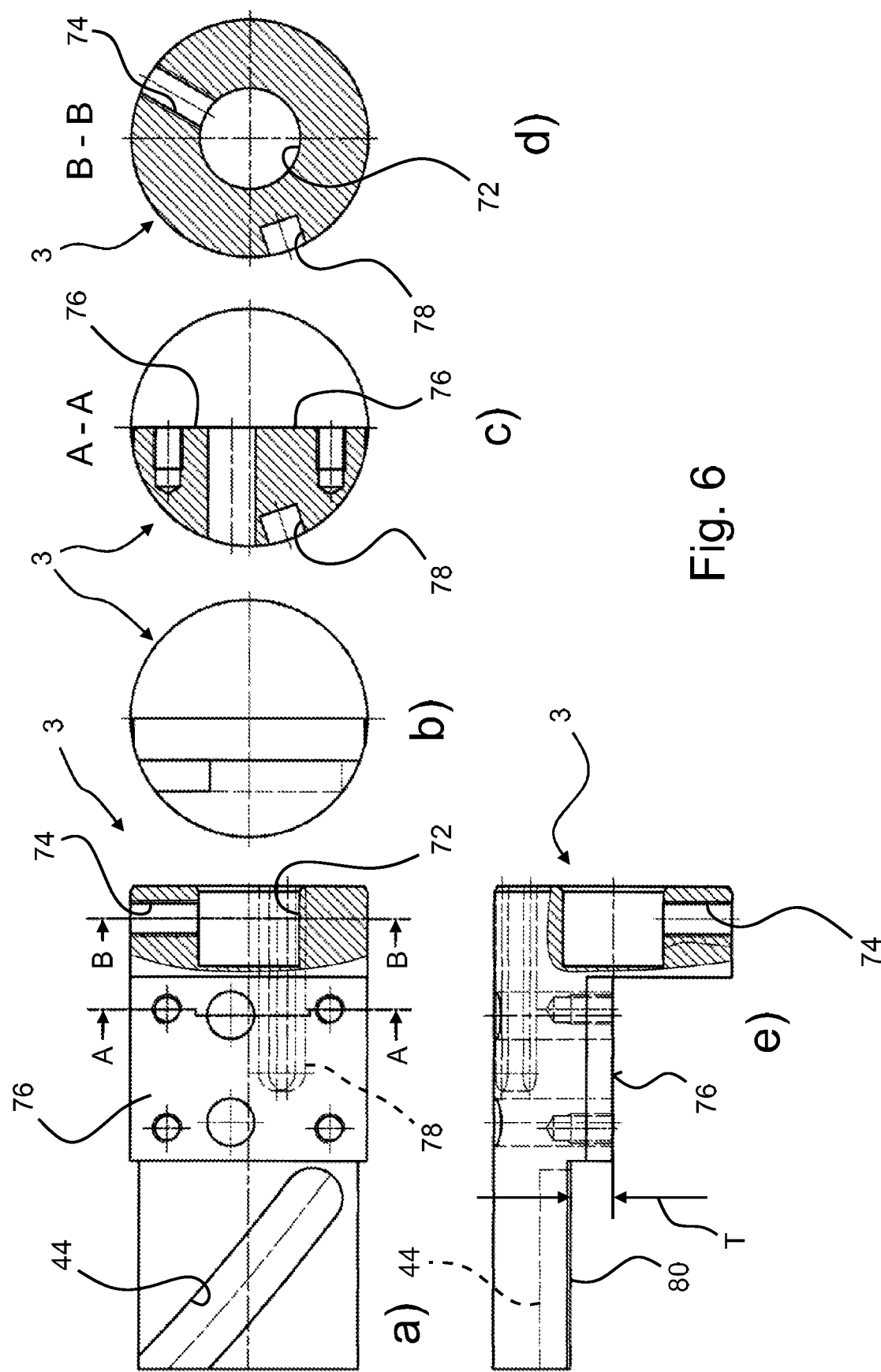
Figure 7:
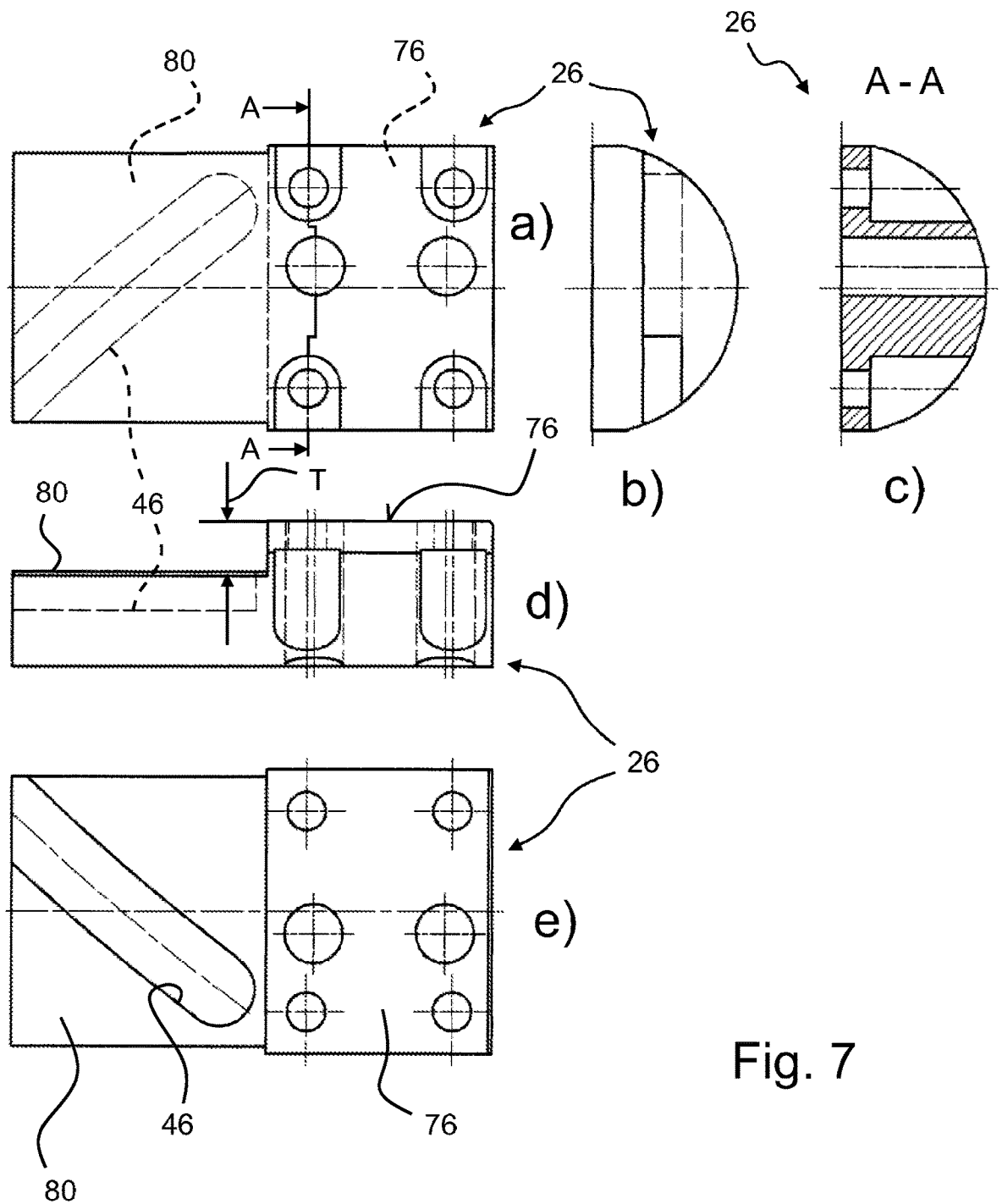
Figure 9:
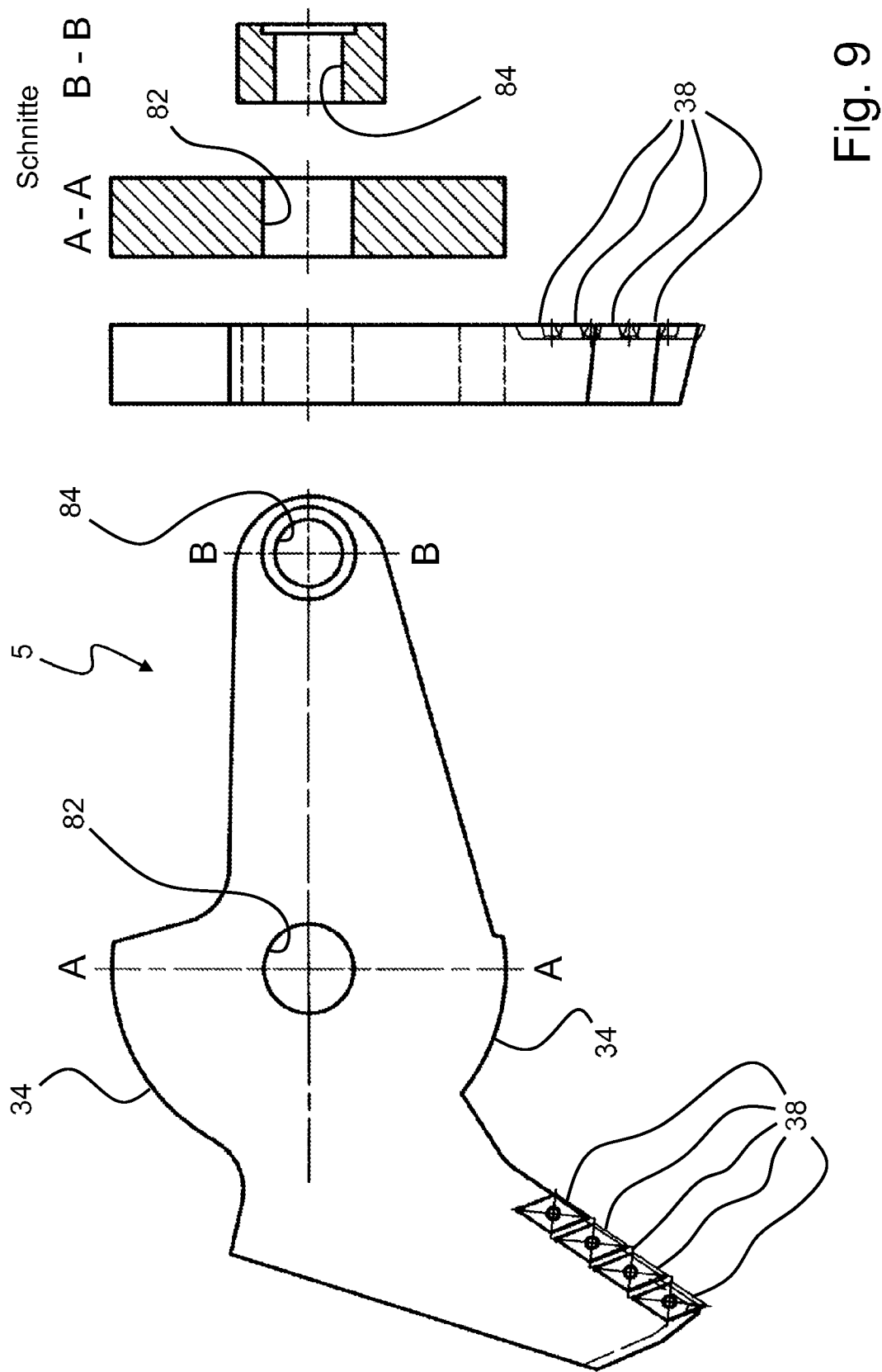
Figure 10:
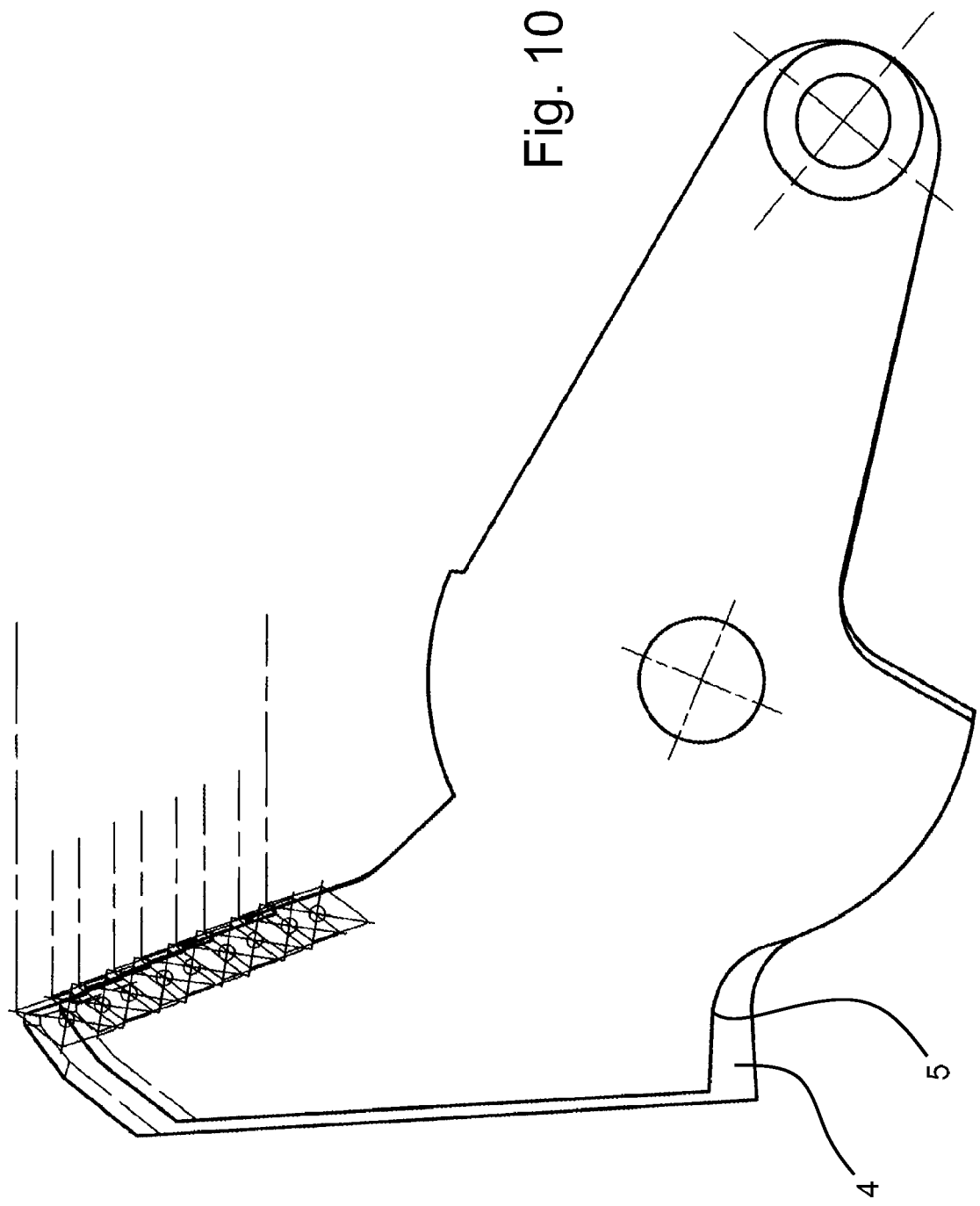
Figure 11:
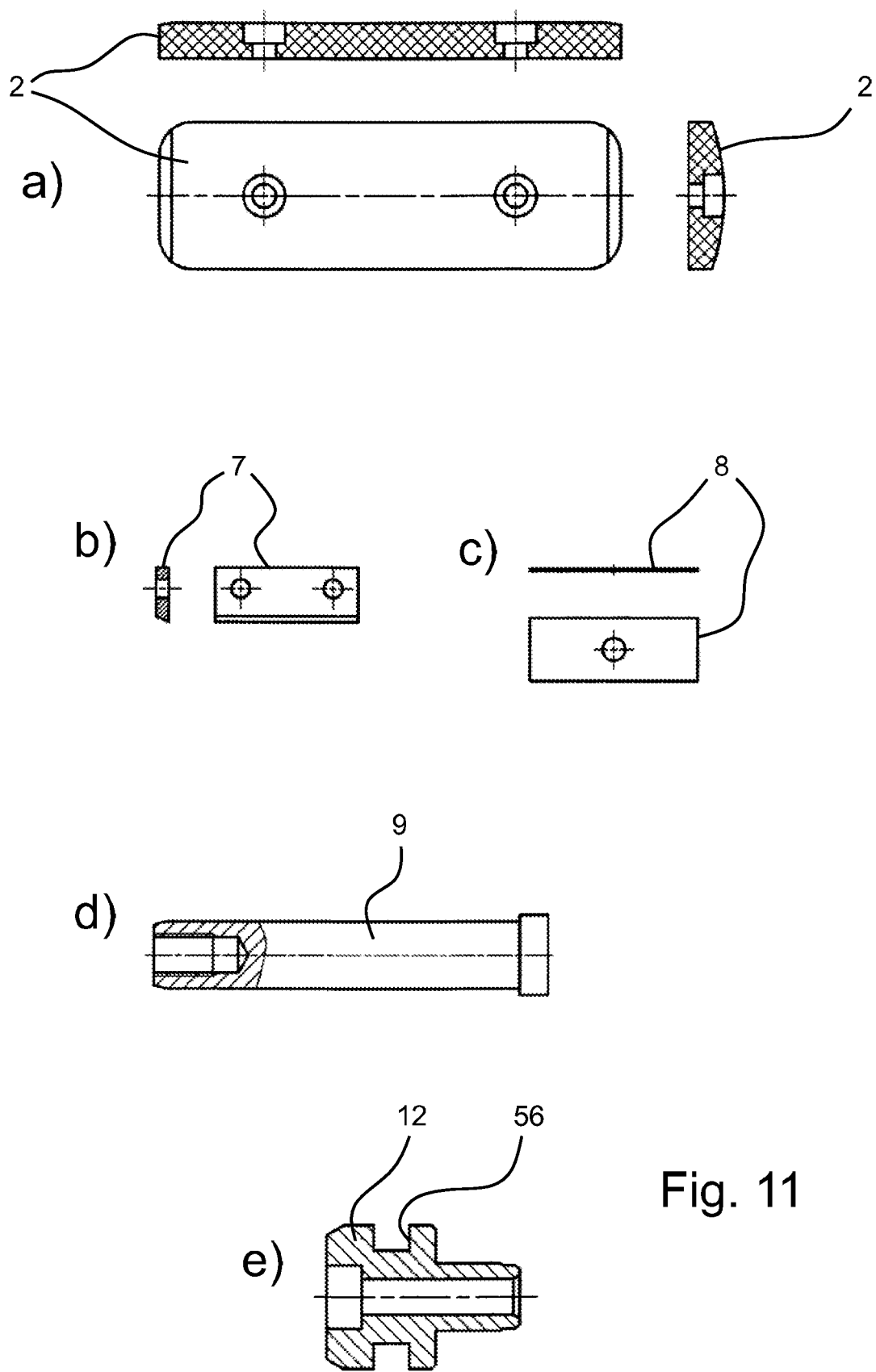
Figure 13:
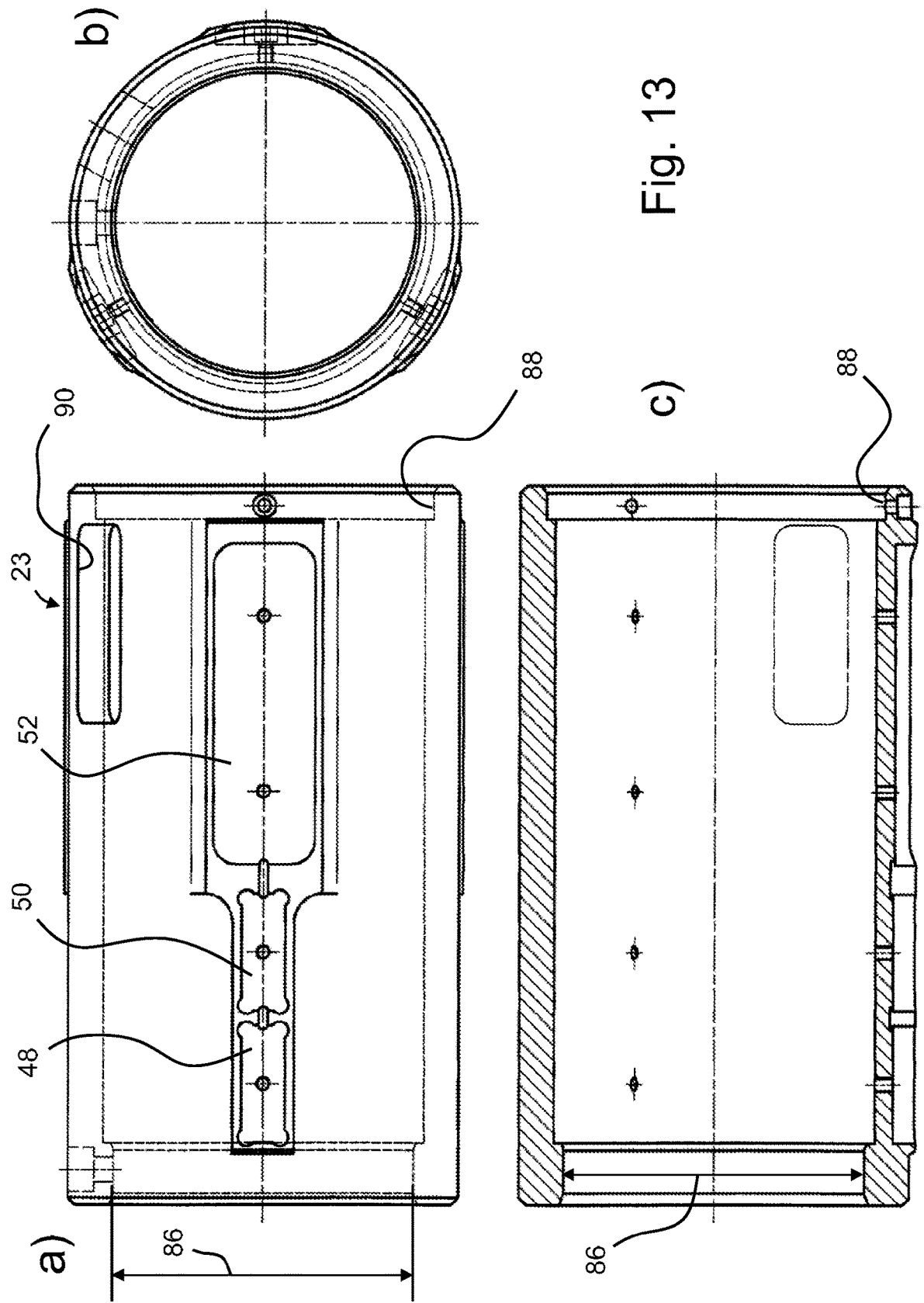
Figure 14:
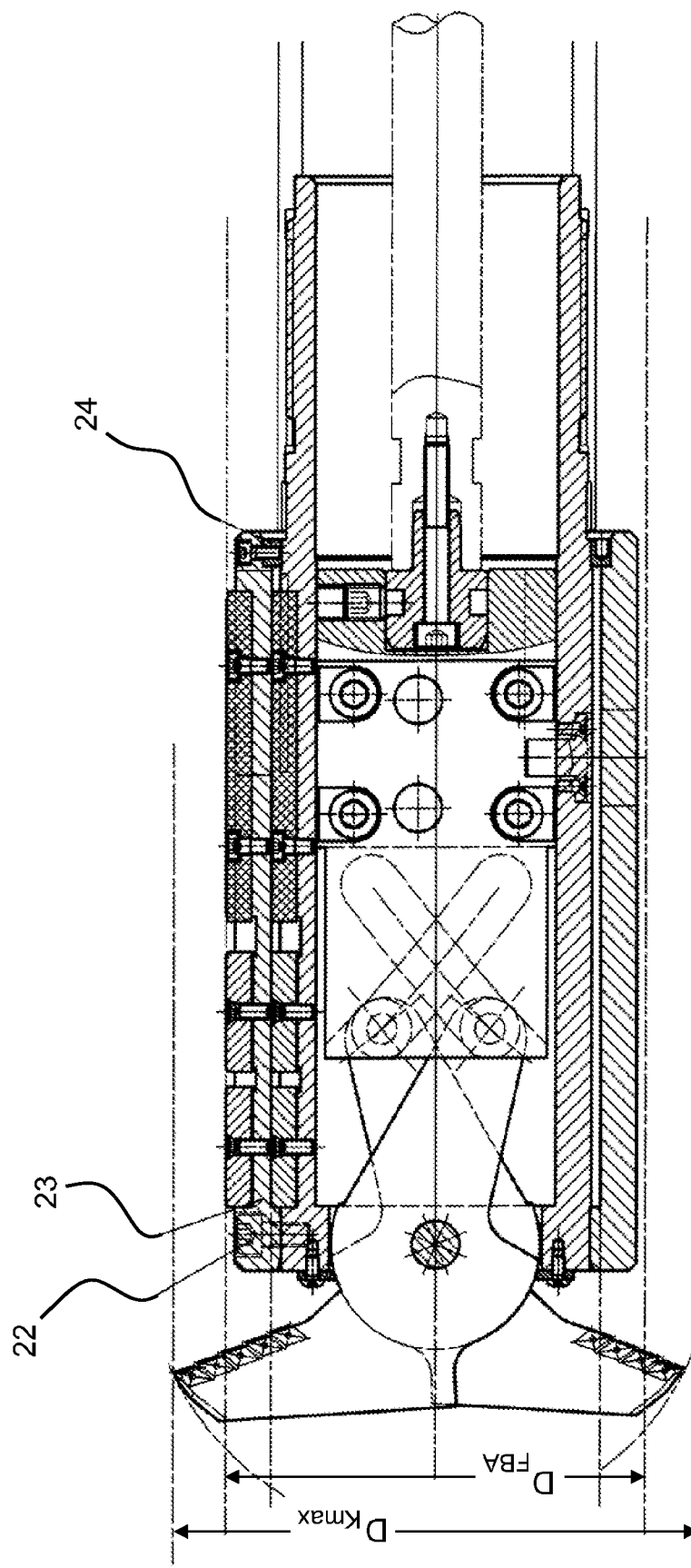
Figure 15:
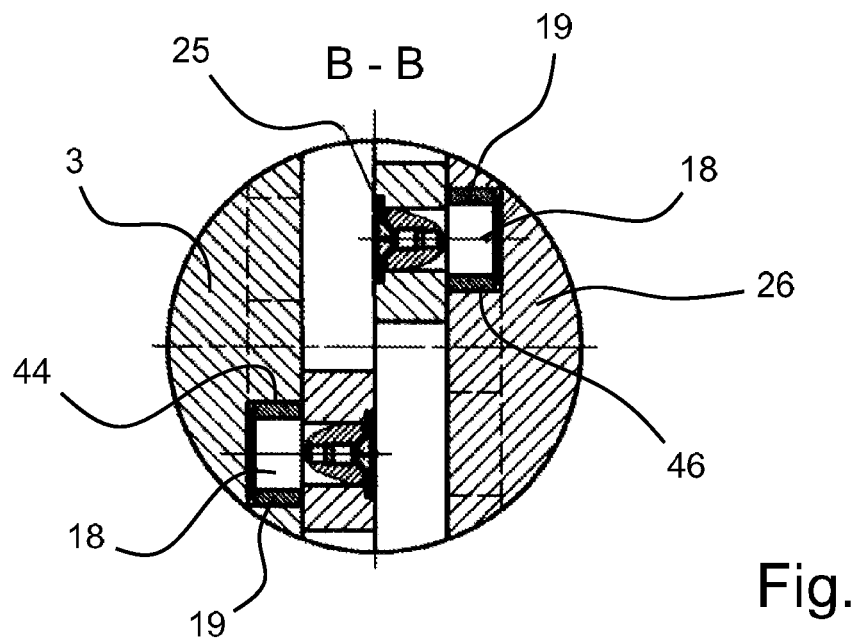
Figure 16:
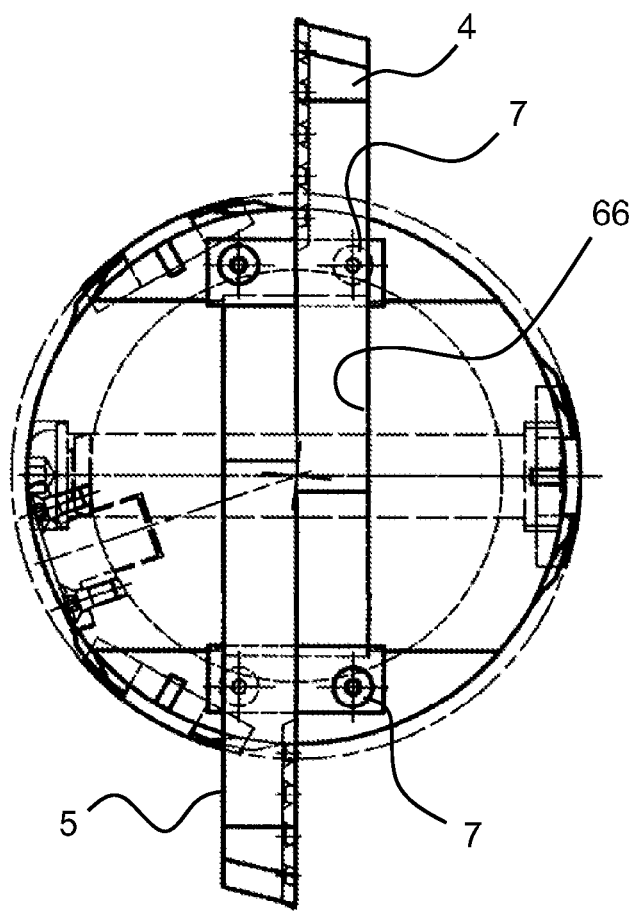
Figure 17:
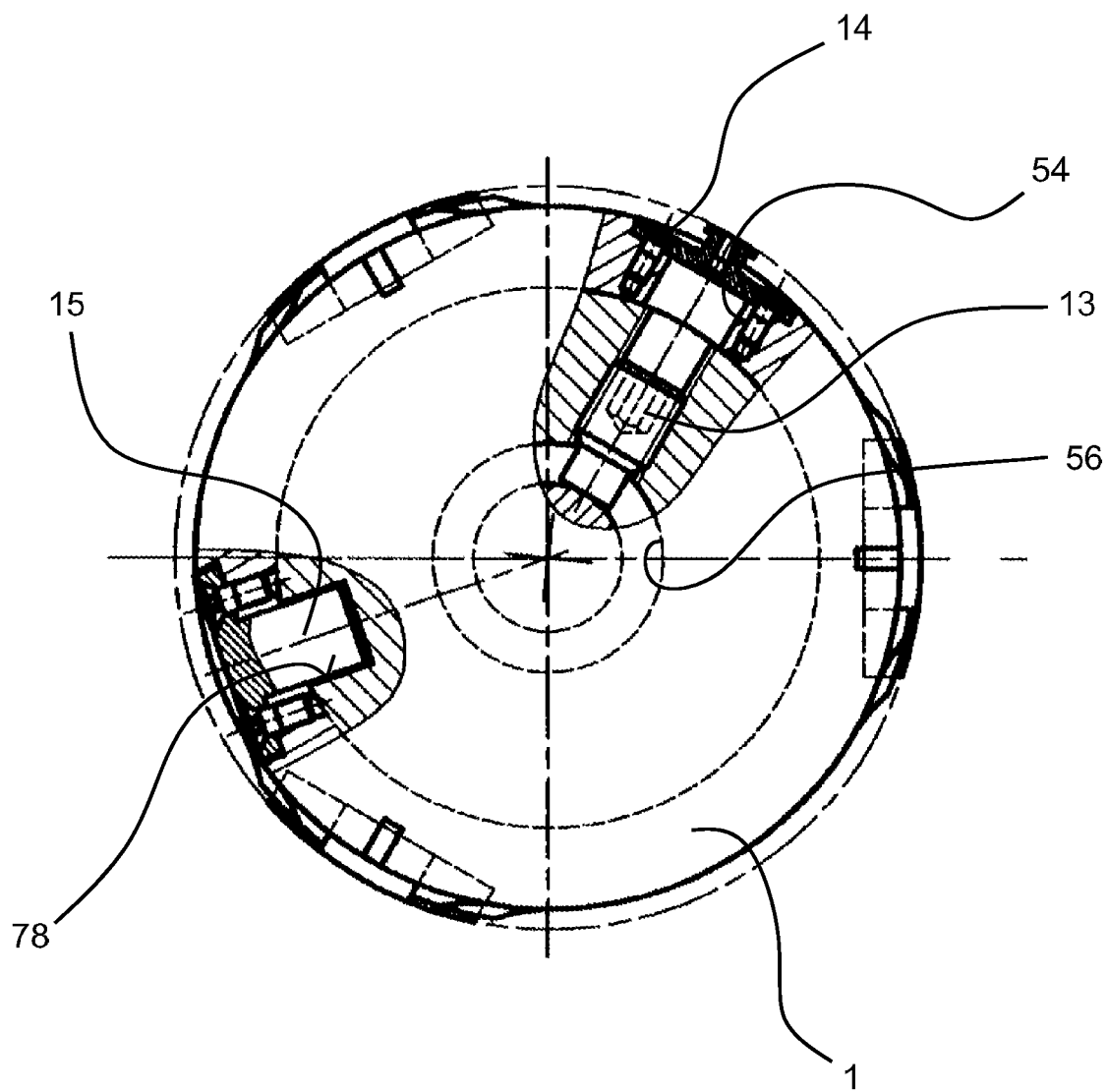

FIGS. 5.1 a) and b) show the body of the drill head according to the invention in two views;

FIG. 5.2 c) to f) show the body of the drill head according to the invention in different sections;

FIG. 6 a) to e) show the lower part of an advancing element, in different views;

FIG. 7 a) to e) show the upper part of the advancing element;

FIG. 8 shows a first insert holder 4 in a partial section;

FIG. 9 shows the second insert holder 5 in a partial section;

FIG. 10 shows the first and second insert holders superimposed;

FIGS. 11 a) to e) and 12 a) to d) are views of various individual parts of the drill head according to the invention;

FIG. 13 a) to c) show an adapter sleeve according to the invention;

FIG. 14 is a longitudinal section through a drill head according to the invention with an adapter sleeve attached; and FIGS. 15 to 17 are various sectional views of the drill head according to the invention.

DESCRIPTION OF THE EMBODIMENT

The figures relate to the same embodiment. In FIGS. 1, 2, 3 and 4, the focus is more on the function of the drill head, while many of the other drawings show individual parts and design details of the drill head.

Because the drill head according to the invention is a relatively complex tool, not all details can be seen in the assembly drawings (e.g. FIGS. 1 to 4). The individual parts are therefore shown in separate drawings in different views, and so the mode of operation and the structure of the drill head according to the invention can be understood from an overview of all the figures.

Figure 1:
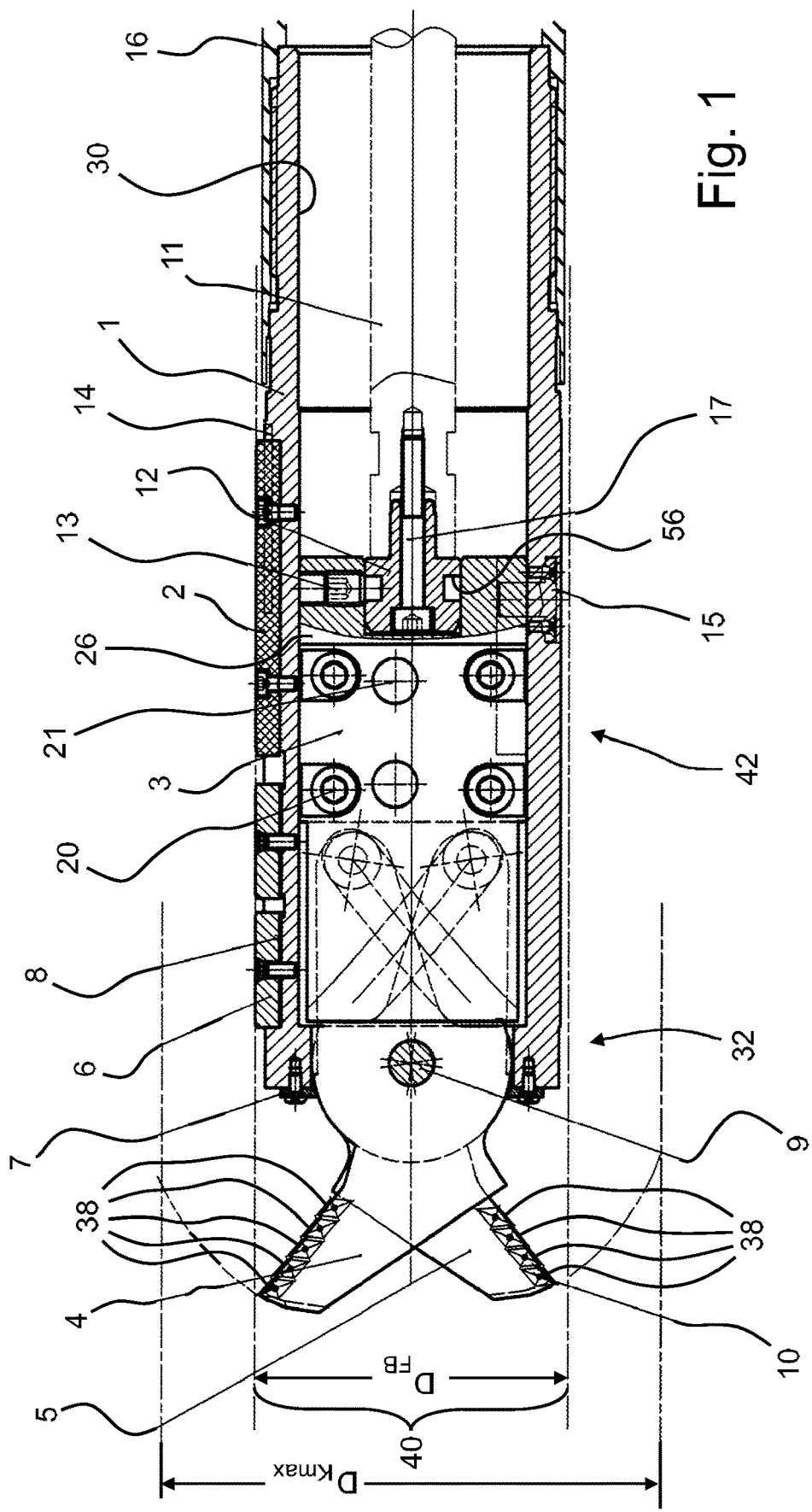
FIG. 1 is a section through an embodiment of a drill head according to the invention with retracted insert holders or inserts.

FIG. 1 shows a longitudinal section through a drill head according to the invention, the drill head comprising a tubular body 1 with a central hole 30. The right-hand end of the body 1 in FIG. 1 is the rear end, while the front end 32 of the body 1 or drill head is shown on the left-hand side in FIG. 1.

At the front end 32 of the body 1, a bearing pin 9 on which two insert holders 4 and 5 are pivotably mounted is visible. The insert holders 4 and 5 are two-armed levers, the pivot point of which is determined by the bearing pin 9. To the left of the bearing pin 9, the first levers of the insert holders 4, 5 are shown, on which a plurality of inserts 38 are arranged. The use of a plurality of relatively small inserts has the advantage that narrow chips are produced. A total of five inserts 38 are arranged on the first lever of the insert holder 4, while four inserts 38 are arranged on the first lever of the insert holder 5. The inserts 38 of the two insert holders are also arranged so as to be somewhat offset on the insert holders 4 and 5, resulting in an interrupted cut or relatively narrow chips. This offset is illustrated in FIG. 10.

In FIG. 1, the insert holders 4, 5 are shown in the fully pivoted-in position, so that the tips of the outermost inserts 38 do not protrude beyond a diameter $D_{FB}$ of a guide hole, which is indicated by a dash-dotted line 40.

In order to achieve this pivot position of the insert holders 4 and 5, an advancing element 42, of which an upper part 3 and a part of a lower part 26 can be seen in FIG. 1, must be pushed all the way to the front end 32 in the central hole 30. This advancing movement is transmitted to the advancing element 42 via a control rod 11 and a coupling piece 12.

Figure 2:
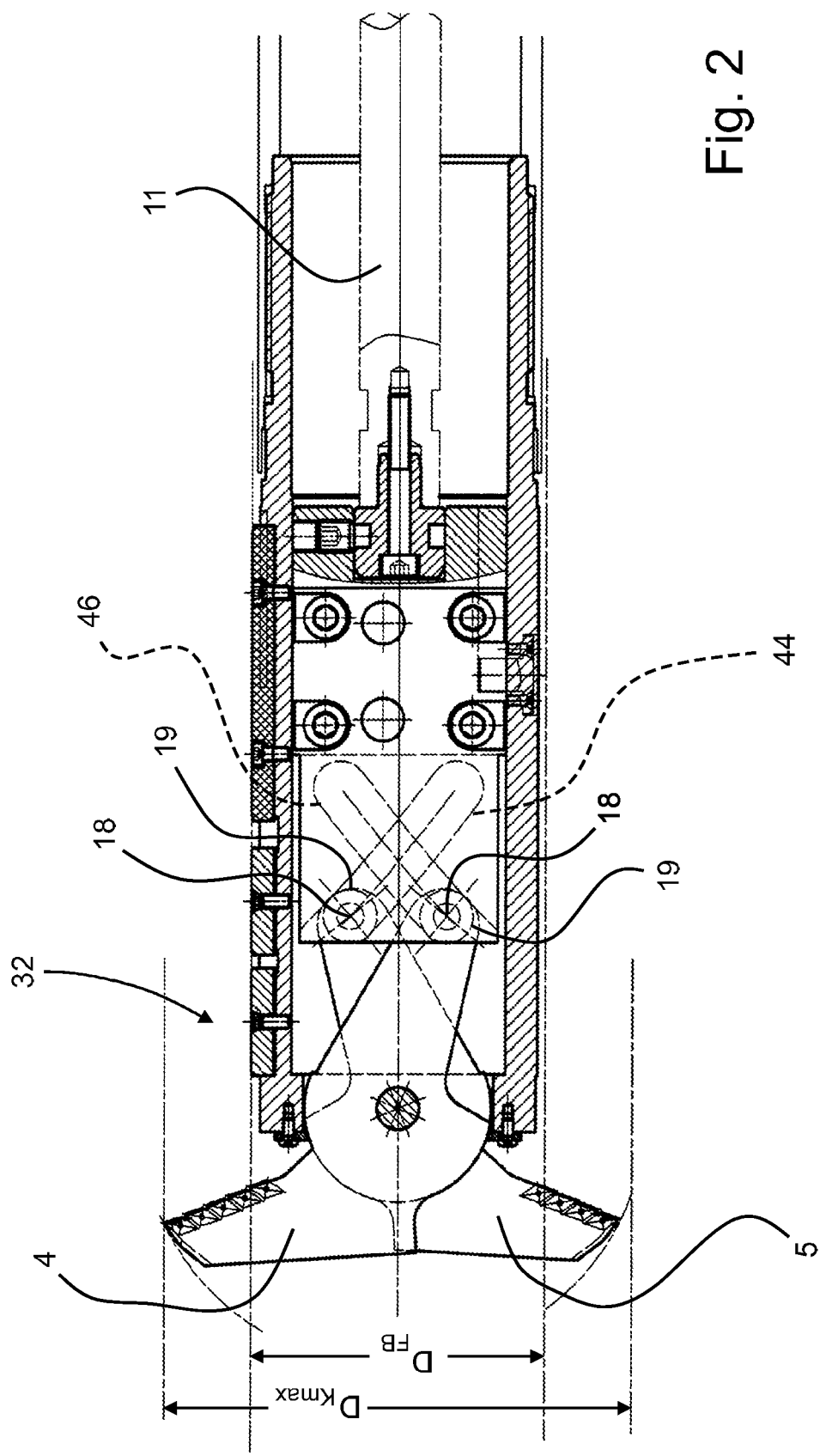
FIG. 2 is a section through the same embodiment of a drill head with pivoted-out insert holders or inserts.

When the control rod 11 is moved to the right relative to the body 1, as shown in FIG. 2, then it takes the advancing element 42 with it. As a result, the inserts 4 and 5 pivot outward so that the tips of the inserts 38 protrude in the radial direction clearly beyond the diameter of the body 1 or the guide hole. The maximum diameter D max is shown in FIG. 2, as is the diameter $D_{FB}$ of the guide hole 40, which corresponds to the minimum diameter of the drill head. The ratio $D_{max}/D_{FB}$ is greater than 1.55 in the embodiment shown.

It can be clearly seen in FIGS. 2 and 10 that the insert holders 4 and 5 have somewhat different geometries so that the diameters on which the inserts 38 are arranged are different. In the embodiment shown, the final diameter is produced by the outermost insert 38 on the insert holder 4. In contrast, the inserts 38 of the insert holder 5 are arranged so as to be somewhat set back radially.

The pivoting movements of the insert holders 4 and 5 are carried out by a positively driven link motion (cam mechanism). A pin 18 and an optional roller 19 are arranged at the rear ends of each of the insert holders 4 and 5. Each of these pins 18 or rollers 19 engages in a slotted link of the advancing element 42.

The individual parts of the advancing element 42, namely a lower part 3 and an upper part 26, are shown in detail in FIGS. 6 and 7. A first slotted link 44 is incorporated in the lower part 3, while a second slotted link 46 is provided in the upper part 26. As can be seen from the comparison of FIGS. 1 and 2, the pins 18 and the rollers 19 "drift" through the slotted links 44 and 46 when the advancing element 42 is moved between the two end positions shown in FIG. 1 and FIG. 2.

Figure 3:
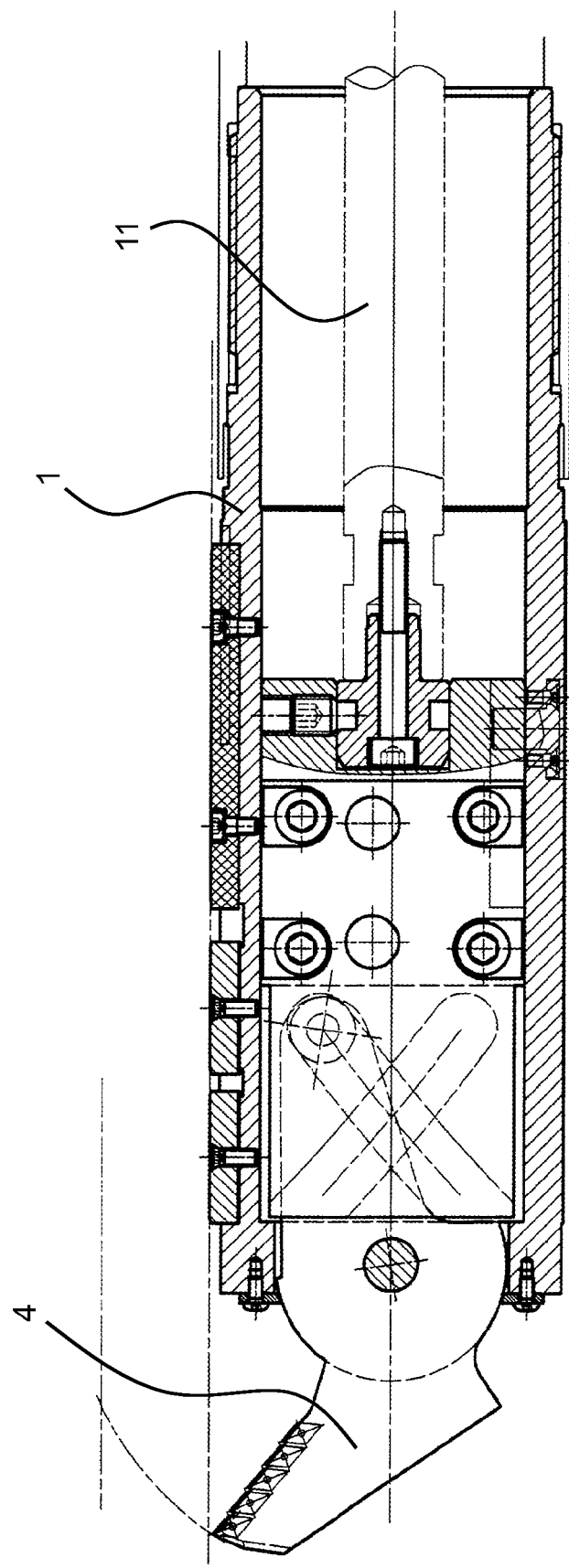
FIGS. 3 and 4 are views similar to FIGS. 1 and 2, with an insert holder having been removed for reasons of clarity.
Figure 4:
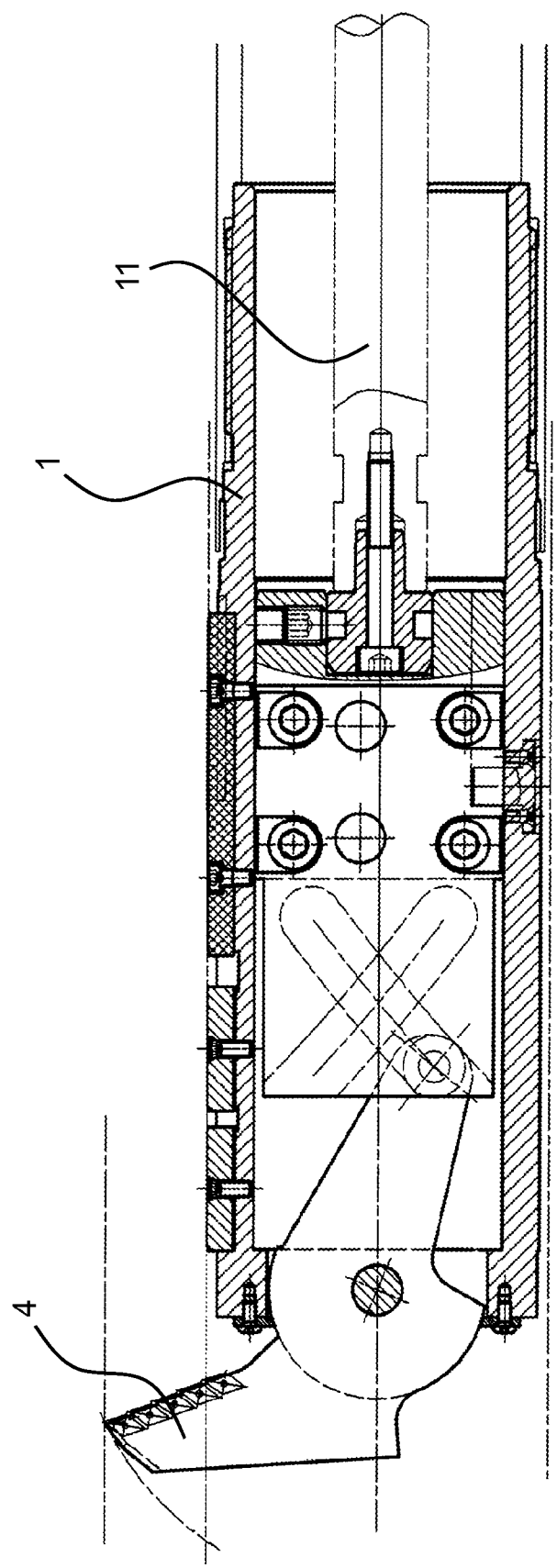

FIGS. 3 and 4 show the motion control again using the insert holder 4 as an example. For the sake of clarity, the insert holder 5 is not shown.

FIG. 5.1 shows the body 1 in a side view (FIG. 5.1a)) and a view from the front (FIG. 5.1b)). FIG. 5.2 shows the body 1 in a longitudinal section (FIG. 5.2c)) and various cross sections (FIG. 5.2d) to f)) along the lines B-B, C-C and D-D.

As can be seen from the side view according to FIG. 5.1a), various pockets 48, 50 and 52 are produced on the outer diameter of the body 1. The pockets 48, 50 and 52 are used to receive guide pads or damping pads.

An elongate hole 54 is provided in the upper part in the region of the line D-D. The elongate hole 54 makes it possible to actuate a coupling pin 13 such that a form-fitting connection is produced between the lower part 26 of the advancing element 42 and a coupling piece 12 (see FIG. 11a) to e)). As can be seen, for example, from FIG. 1, the coupling pin 13 is screwed into a circumferential groove 56 in the coupling piece 12 in order to produce the desired form-fitting connection. The flanks of the circumferential groove 56 can also be slightly conical. The coupling piece 12 is in turn connected to the control rod 11 via a central connecting screw 17.

An opening 58 can also be seen in FIG. 5.1a). A length stop 15 is inserted through this opening 58 and screwed to the body 1 with four screws. The axial movement of the advancing element 42 within the body 1 is thus restricted. A cylindrical projection 60 is formed on the front end 32 of the body 1. The longitudinal axis of the cylindrical projection is provided with reference sign 64 in the sectional view in FIG. 5.2c). Said axis coincides with the longitudinal axis of the bearing hole 62 and, accordingly, also the longitudinal axis of the bearing pin 9.

As can be seen from the sectional views in FIG. 5.2d) to 5.2 f), an opening 66 is provided at the front end 32 of the body 1. The longitudinal axis of the opening 66 coincides with the longitudinal axis of the body 1 or the hole 30. As can be seen from the section along the line B-B (FIG. 5.1a)), the opening 66 has a rectangular cross section. The insert holders 4 and 5 are received in this opening 66 and are guided and held in a planar manner. Most of the cutting forces are introduced into the body via the contact surfaces between the insert holders 4, 5 and the opening 66.

In the side view of FIG. 5.1a), a fitting surface 68 is shown in the region of the front end. Ultimately, this is nothing more than a region that has a slightly reduced diameter and is very precisely ground or otherwise finely machined. If necessary, an adapter sleeve 23 (see FIG. 13a)) can be placed on this fitting surface 68 and is then centered there. This shoulder is also used to receive the drill head on a lathe when e.g. the damping pads are reworked. At the opposite end of the body 1, a shoulder 70 is formed which can receive a distance ring 24 (see FIG. 12 a)).

In FIGS. 6 and 7, the lower part 3 (FIG. 6a)) to e)) and the upper part 26 (FIG. 7a) to e)) of the advancing element 42 are shown in different views and sections. When the lower part 3 and the upper part 26 are screwed together, they have a cylindrical outer contour, the diameter of which corresponds to the diameter of the central hole 30 in the body 1. There is a fit with little play (clearance fit) between the central hole 30 in the body 1 and the cylindrical outer contour of the lower part 3 and upper part 26. The advancing element 42 is thus guided in an axially displaceable manner in the central hole 30 of the body 1.

As can be seen from the section B-B in FIG. 6d), the lower part 3 is designed to be circular in this region. There, too, the outer diameter corresponds to the diameter of the central hole 30 in the body 1.

The lower part has a receptacle 72 in the center. The coupling piece 12 (see FIG. 1) is inserted into this receptacle 72. Furthermore, there is a radially extending threaded hole 74 which opens into the receptacle 72. The threaded hole 74 is shown rotated in FIGS. 6a) and 6e). The position of the threaded hole 74 is shown correctly in FIG. 6d). A coupling pin 13 (see FIGS. 1 and 2) is screwed into the threaded hole 74. When the coupling pin 13 engages in the circumferential groove 56 (see FIG. 1) of the coupling piece 12, there is a form-fitting connection between the coupling pin 12 and the lower part 3 of the advancing element 42.

The coupling pin 13 is not shown in FIG. 6a) to e). Said pin is actuated by a screw driver which is inserted into the interior of the body 1 through the elongate hole 54 (see FIG. 5.1a)).

In a central region (see section plane A-A in FIG. 6c)) the lower part 3 is designed as a half-cylinder. That is to say, in this embodiment, a longitudinal axis of the coupling element 42 lies in the contact surface 76 between the lower part 3 and the upper part 26.

In FIG. 7 a) to e), the upper part 26 of the advancing element 42 is shown in different views. In the region of a contact surface 76, through-holes are made which are used to receive screws (not shown) or fitting pins (not shown). This makes it possible for the upper part 26 and the lower part 3 of the advancing element 42 to be screwed and pinned together. The separating plane between the lower part 3 and upper part 26 coincides with the contact surface between the two contact surfaces 76 of both parts.

A recess 80 is also made in the upper part 26. The second slotted link 46 is incorporated in the base of the recess 80.

The pin 18 or the roller 19 of the insert holder 4 engages in the second slotted link 46.

In FIGS. 8 and 9, the insert holders 4 and 5 are shown in different views and sections. It can be seen clearly from FIGS. 8 and 9 that the insert holders 4, 5 can be understood as two-armed levers. The pivot axis extends approximately through the center of the insert holders 4, 5. Said axis is defined by the hole 82.

Inserts 38 are arranged on the first arm of the insert holders 4, 5. The inserts 38 of the two insert holders 4 and 5 are not arranged on the same diameter, as can be seen from FIG. 10. The insert holders 4 and 5 are placed one on top of the other here. The outer contour of the insert holders 4 and 5 is designed such that there are two circular-arc-shaped portions (34) in each case. The center of the circular arc 34 coincides with the center of the hole 82. The hole 84 at the rear end of the insert holders 4, 5 in the installed position is used to receive the pin 18 and thus indirectly the roller 19. The roller 19 engages in the slotted links 46 and 44 of the advancing element 42.

It can be seen that the distances between the holes 82 and 84 in the two insert holders 4 and 5 are identical. The circular arcs 34 are also designed to be the same. When the insert holders 4 and 5 are inserted into the body, this results, together with the cylindrical projection 60, in a smooth outer contour in the region of the projection 60 and chips cannot get into the interior of the drill head.

FIG. 11 shows:

A damping pad 2 (FIG. 11a)), a sealing pad 7 (FIG. 11b)) which is used at the end face 32 to seal the drill head in the region of the opening 60, and an adapter plate 8 (FIG. 11c)) which is arranged between a guide pad 6 and the body 1 in order to adapt the diameter of the guide pads or the drill head precisely to the diameter of the guide hole 40.

A pin 9 (FIG. 11d)) and a coupling piece 12 (FIG. 11e)) are also shown in FIG. 11. In the coupling piece 12, the circumferential groove 56 can be clearly seen, along with a central hole (without a reference sign). A connecting screw 17 is inserted through the central hole and screwed into the control rod 11, as can be seen from FIGS. 1 and 2.

A distance ring 24 is shown in FIG. 12a). The distance ring 24 is used to center an adapter sleeve 23 (see FIG. 13a)) at the rear end of the body 1.

FIG. 12b) shows a cover or protection plate 14. This is used to cover the actuation opening in the body 1. The actuation opening allows the coupling pin 13 to be mounted in the lower part 3 by the coupling pin 13 being screwed into the circumferential groove 56 in the coupling piece 12 (see FIG. 1).

An end stop 15 (FIG. 12c)), the pin 18, a roller 19 and a disk 25 (FIG. 12d)) are also shown. The disk 25 is used to axially secure the pin 18 in the insert holders 4, 5 (see FIG. 15).

An adapter sleeve 23 is shown in FIG. 13. At its end on the left in FIG. 13a), said sleeve has a hole 86 of which the diameter is precisely matched to the fitting surface 68 at the front end 32 of the body 1 (see FIG. 5.1a)). The adapter sleeve 23 is thus centered at the front end 32 via the hole 86 and the fitting surface 68. A fitting 88 is formed at the rear end of the adapter sleeve 23 (i.e. on the right-hand side in FIG. 12a). The diameter of the fitting 88 corresponds to the outer diameter of the distance ring 24 (see FIG. 12 a)), so that the adapter sleeve 23 is positioned and centered at the rear end via the fitting 88 and the distance ring 24 on the body 1.

The adapter sleeve 23 has pockets 48, 50 and 52 which have the same dimensions and functions as the pockets 48, 50 and 52 of the body 1.

Guide pads and damping pads and, if necessary, adapter plates 8 are inserted therein.

An opening 90 is made in the adapter sleeve 23 (see FIG. 13a)). Through this opening 90, it is possible to reach the elongate hole 54 in the body 1 and then the threaded pin or the coupling pin 13 in the advancing element 42, e.g. using a screw driver or the like.

FIG. 14 shows a drill head according to the invention with an attached adapter sleeve 23 and distance ring 24. Compared to the design without an adapter sleeve, the diameter of the guide hole $Dr_{FBA}$ is larger. In this way it is possible, by using different adapter sleeves 23, to adapt the drill head to different guide diameters or diameters of guide holes.

FIG. 15 shows a section through the advancing element 42 with inserted insert holders 4 and 5. This sectional view clearly shows the coupling (cam mechanism) between the rear ends of the insert holders 4 and 5 and the slotted links 46 and 44 by means of the pins 18 and the rollers 19.

FIG. 16 shows a view from the front of the drill head according to the invention. In this view, it can be clearly seen that the opening 66 is completely filled by the insert holders 4 and 5, so that it is almost impossible for chips to penetrate into the interior of the drill head. In addition, the sealing pads 7 can be clearly seen in this view.

FIG. 17 shows a section through the drill head according to the invention. In this section, the protection plate 14, the elongate hole 54, the coupling pin 13, the circumferential groove 56 in the coupling piece 12 and the axial groove 78 in the advancing element 42 and the end stop 15 can be seen.

What is claimed is:

1. Drill head for chambering, comprising a body with a rear end and a front end, the body having a mechanical interface at the rear end for connection to a drill tube, the body having an end face and comprising a central hole, the drill head comprising first and second insert holders which are pivotably mounted on the body, and the first and second insert holders and an advancing element being coupled to one another via a link motion in such a way that a movement of the advancing element in the axial direction relative to the body triggers a pivoting movement of the first and second insert holders, and the advancing element is axially displaceably guided in the hole along a central axis of the drill head, wherein, the advancing element comprises a first slot diagonally formed along a first slot axis having a first inclination with respect to the central axis and a second slot diagonally formed along a second slot axis having a second inclination with respect to the central axis, wherein the first inclination and the second inclination are reverse in relation to each other, one of a first pin and a first roller are provided on the first insert holder, one of a second pin and a second roller are provided on the second insert holder, the first pin or the first roller of the first insert holder configured to interact with the first slot of the advancing element, and the second pin or the second roller of the second insert holder configured to interact with the second slot of the advancing element, wherein a bearing pin having a longitudinal axis is provided on the end face of the body and pivotably mounts the first and second insert holder to the body.

2. Drill head according to claim 1, characterized in that a cylindrical projection is formed on the end face of the body, and in that the longitudinal axis of the bearing pin and a longitudinal axis of the cylindrical projection extend coaxially to one another.

3. Drill head according to claim 1, characterized in that an opening for the first and second insert holders is formed on the end face of the body, and in that a longitudinal axis of the opening extends orthogonally to the longitudinal axis of the bearing pin.

4. Drill head according to claim 1, characterized in that an outer contour of the first and second insert holders is formed in some regions in a shape of a circular arc, in that the circular arc has a center point being spaced apart from the circular arc by a distance of a radius of the circular arc, and in that the center point of the circular arc coincides with the longitudinal axis of the bearing pin.

5. Drill head according to claim 1, characterized in that the advancing element comprises a lower part and an upper part, in that the lower part is adapted to connect to a control rod, and the first slot is formed in the upper part and the second slot is formed in the lower part.

6. Drill head according to claim 5, characterized in that both the upper part and the lower part comprise a recess, and in that a depth of the recesses corresponds to a thickness of the first and second insert holders.

7. Drill head according to claim 6, characterized in that a dividing plane between the upper part and the lower part extends through a longitudinal axis of the advancing element, and in that the recesses extend in parallel with the dividing plane.

8. Drill head according to claim 1, characterized in that the advancing element comprises a receptacle for a coupling piece and a threaded hole for a coupling pin.

9. Drill head according to claim 8, characterized in that the coupling piece is connected to the control rod.

10. Drill head according to claim 1, further comprising at least one adapter sleeves.

11. Drill head according to claim 10, characterized in that a fitting surface for centering the at least one adapter sleeve is formed on the front end of the body.

12. Drill head according to claim 10, further comprising a fitting ring, and in that the fitting ring centers the at least one adapter sleeve at the rear end of the body.

* * * * *